Sept. 6, 1960
J. C. WHITE ET AL
2,951,802
ELECTROLYTIC OXYGEN GENERATOR
Filed June 5, 1957
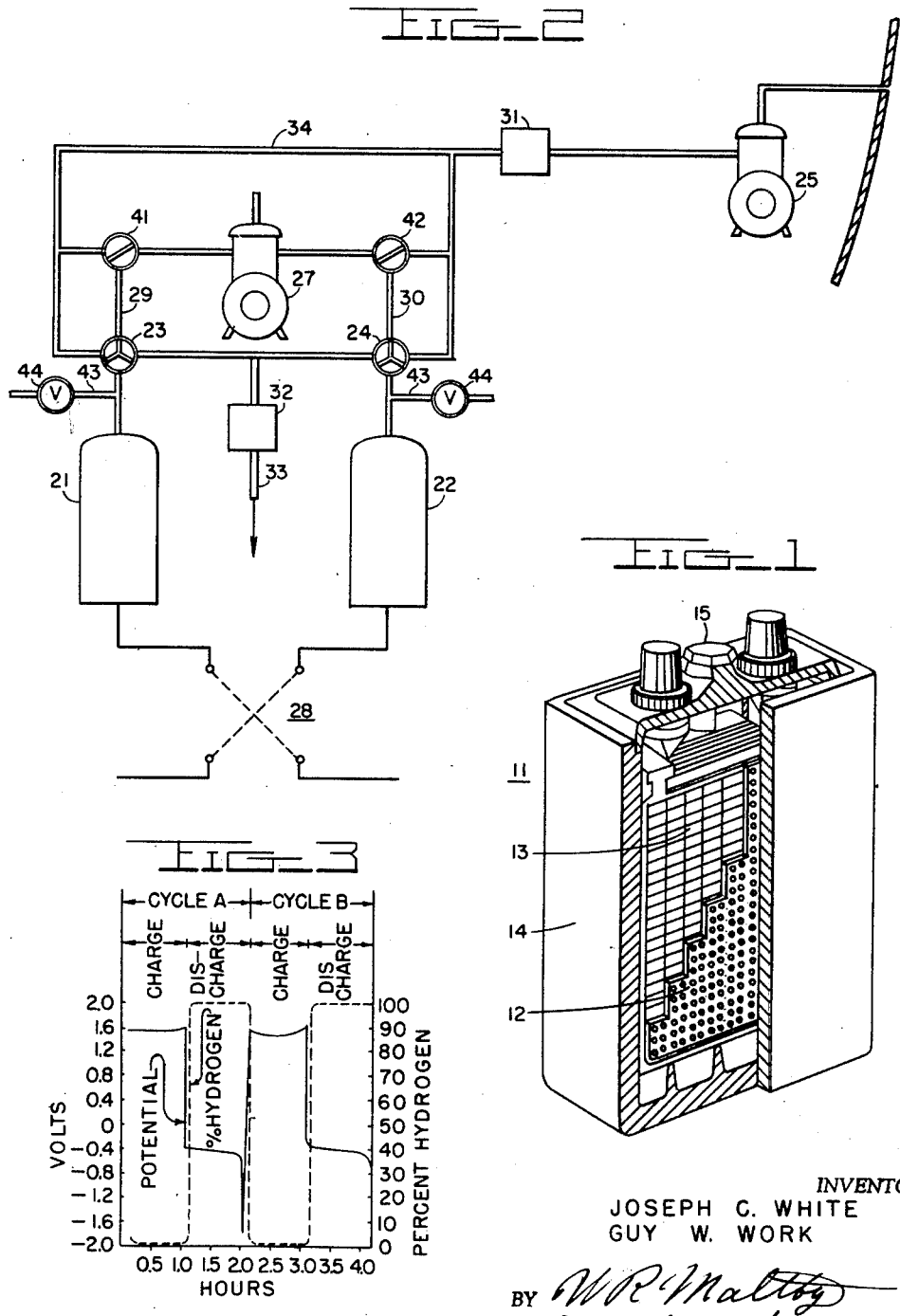
INVENTORS
JOSEPH C. WHITE
GUY W. WORK
BY
ATTORNEYS

2,951,802

ELECTROLYTIC OXYGEN GENERATOR

Joseph C. White, University Park, Md., and Guy W. Work, Livingston, N.J., assignors to United States of America as represented by the Secretary of the Navy Filed June 5, 1957, Ser. No. 663,856

5 Claims. (Cl. 204—270)

(Granted under Title 35, U.S. Code (1952), sec. 266)

The invention described herein may be manufactured and used by or for the Government of the United States of America for governmental purposes without the payment of any royalties thereon or therefor.

The present invention relates to electrolytic gas generators for electrolytic generation of oxygen without the accompanying generation of hydrogen and more particularly to a system for continuous generation of oxygen in a submarine by electrolysis of water.

Electrolysis of aqueous solutions of caustic alkalis or of oxygen-containing acids has been used as a method of obtaining very pure oxygen and hydrogen. The best known types of commercial cells for this purpose comprise electrodes of iron group metal, usually of nickel-plated iron, separated by a diaphragm used to separate the oxygen from the accompanying hydrogen and as an electrolyte, a solution of sodium hydroxide or potassium hydroxide in a concentration between 10% and 35%. Another type makes use of a continuously depolarized cathode, suitably an air-depolarized porous carbon cathode in combination with an insoluble or passive anode in an aqueous electrolyte of potassium hydroxide or sodium hydroxide.

The prior art devices present several problems in adapting such devices for use on submarines and the devices presently used on submarines require periodic resurfacing for generation of oxygen which is stored in pressure tanks. The pressure type oxygen generators now used are very heavy, they require considerable space and current and the pressures involved dictate to a great extent the configuration of the cell and limit the possibilities in cell design to a very narrow range.

It is an object of the present invention to provide an oxygen/hydrogen generator similar in structure to an alkaline type of storage battery.

Another object is to provide a system for continuously generating oxygen.

Yet another object is to continuously generate oxygen without any effects on the plates of the generator.

Still another object is to provide a system for generating oxygen in a device without drawing a continuous supply of oxygen gas from its immediate environs.

Another object is to eliminate the need for a diaphragm which is required in all electrolytic oxygen generators.

Another object is to provide a new type of electrolytic oxygen generator free from the usual accompanying generation of hydrogen.

Other and more specific objects of this invention will become apparent upon a more careful consideration of the following detailed description when taken together with the accompanying drawings, in which:

Fig. 1 illustrates a typical oxygen generator cell cut away to illustrate the plates therein;

Fig. 2 illustrates a system used for continuous generation of oxygen; and

Fig. 3 illustrates potential and gas concentration changes during two 90-ampere cycles of a single generator cell.

The present invention comprises a storage battery type cell which has been modified to include negative plates filled with cadmium active material and positive plates of sheet nickel to generate either oxygen or hydrogen by electrolysis depending on the direction of current flow through the cell. Two or more cells properly positioned and connected in a system will enable generation of oxygen from one cell and generation of hydrogen from another cell. This provides a means by which the cells will alternately produce oxygen and hydrogen to provide a system by which oxygen can be continuously produced and admitted to a device requiring a supply of oxygen. Such a system can be used to provide oxygen for a submarine such as a nuclear powered submarine where electrical energy is not at a high premium and where an unlimited supply of water is available for replenishing the water dissipated during electrolysis.

The device and operation of this new type of oxygen generator is so similar to storage batteries that battery terminology will be used for descriptive purposes. The terms "battery," "charge" and "discharge" are not to be taken to mean that electricity is stored in the battery but to be broadly construed as operating similar to a battery. As such, a "charge" will reduce the negative (cadmium) plate while producing oxygen at the sheet nickel electrode and a "discharge" will oxidize the negative plate while producing hydrogen at the sheet nickel electrode.

Referring now to Fig. 1 there is shown by illustration a cell 11 made according to the present invention which comprises positive plates 12 made of perforated sheet nickel (Ni) and negative plates 13 made of any material capable of being charged without the evolution of hydrogen until almost completely charged for example, plates made of a plurality of pockets filled with cadmium active material or sintered nickel-cadmium plates made by impregnating sintered nickel plates with cadmium active material. The plates are alternately positioned within a suitable casing 14 made of nickel plated steel or any other suitable material and connected in parallel to outside terminals. The cell as illustrated by Fig. 1 has fifteen positive and fourteen negative plates. The negative plates are typically formed by a metal frame in which a plurality of flat tubes or nickel-plated steel pockets filled with cadmium active material having a length of about 7 inches, a width of about 0.5 inch, and a thickness of about 0.130 inch. The positive plates are formed by perforated sheet nickel having a height of about 7.7 inches, a width of about 4.7 inches, a thickness of about 0.031 inch with about 7740 perforations per plate, each perforation having a diameter of about 0.043 inch. The plates are properly positioned in the cell and spaced from each other by about 0.062 inch and then the cell is sealed. A solution made up to about 25 percent KOH in distilled water is added to the cell as an electrolyte through an opening 15 in the top which also serves to permit escape of the gases generated and provides a means by which water may be added through appropriate tubes to replenish the water used up by electrolysis.

The unique characteristic of a standard negative cadmium plate in a nickel-cadmium alkaline storage battery is its ability to accept a large part of its charge before hydrogen is evolved. The amount of charge up to the point of hydrogen evolution is referred to as the plates "hydrogen-free capacity" and is believed to be attributed to the sufficiently high hydrogen over voltage and the flat potential characteristic of the plate during most of the normal charge. A similar "oxygen-free capacity" may be observed during discharge.

In operation of the illustrated cell, Fig. 3 represents the potentials and percent of hydrogen concentration for a single cell during two complete cycles of operation at 90-amperes. During a charge, oxygen is produced at a cell potential of 1.6 and during discharge the potential changes to a negative 0.4 volt throughout most of the discharge. Just before the end of the discharge half cycle the potential drops quickly to about a negative 1.6 volts. For continuous operation, the potentials repeat themselves throughout each half cycle and the average potential throughout any complete cycle is about 2.0 volts.

In operation of the cell for evolution of gases, the cell must be connected to a source of direct current which passes through the electrodes and solution which will thus evolve oxygen by electrolysis throughout a "charge" and hydrogen throughout a "discharge."

In starting the process, the positive lead of a power source is connected to the negative terminal and the negative lead is connected to the positive terminal. The current flows through the solution to "discharge" the cell oxidizing the negative (cadmium) electrode and producing hydrogen at the sheet nickel electrode. The reaction during discharge for production of hydrogen may be considered to be as follows:

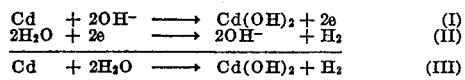

If the "discharge" is continued after all of the available cadmium has been oxidized, the process will go beyond the "oxygen-free capacity" of the electrode and oxygen will also be evolved at the cadmium electrode in addition to reaction III. As soon as the cadmium electrode has been completely oxidized by the current and has expended its "oxygen-free capacity," a reverse process to "charge" or reduce the $Cd(OH)_2$ electrode is started. This is done by reversing the current through the cell which both reduces the $Cd(OH)_2$ and evolves oxygen at the sheet nickel electrode. The electro-chemical reaction which takes place during production of oxygen is as follows:

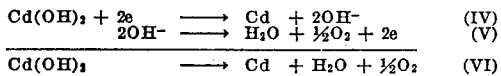

If the charge is continued after the $Cd(OH)_2$ has been all reduced, hydrogen will also be evolved in addition to reaction VI.

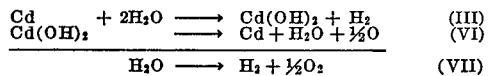

The only maintenance as far as the electrolytic part of the generator is concerned would, therefore, be the periodic addition of water to make up for that used in electrolysis.

To provide an essentially continuous supply of oxygen, as for a submarine or any other purpose, two cells or banks of cells as represented by Fig. 2, could be operated simultaneously—cell 21 charging to evolve oxygen while cell 22 is discharging to evolve hydrogen and to condition that cell for "charging" to produce oxygen. The oxygen produced by charging cell 21 is discharged through appropriate tubing and through a three position valve 23 directly in to the desired space whereas the hydrogen produced by cell 22 is pumped overboard through appropriate tubing and the three position valve 24 by a compressor 25.

Valves 23 and 24 control the outlet of the gases produced by the respective cells and after the respective cells have been simultaneously "charged" or "discharged" through their gas-free capacities, the current through the cells is reversed by a reversing switch 28 and the cells will produce the opposite gas. After the current has been reversed, cell 21 will produce hydrogen and cell 22 will produce oxygen. During a half-cycle reversal of the charging and discharging cells, the positions of valves 23 and 24 must be changed to discharge the gases through appropriate lines to the inside and outside of the desired space.

At the end of a half-cycle (the term cycle being used to denote a completion of either a "discharge" and "charge"; or, a "charge" and a "discharge" for each cell) before the direction of current flow through each cell is reversed to produce the opposite gases in the respective cells, the head-space of each cell and the line between the cells and the valves must be cleared of the gases that the cells were generating. For this purpose some means for example, a vacuum pump 27 is provided to clear the oxygen lines and the hydrogen pumping compressor 25 is used to clear the hydrogen lines from the respective cells. Valves 23 and 24 are positioned to connect respectively lines 29 and 30 to the outlets of cells 21 and 22. Lines 29 and 30 connect respectively to valves 41 and 42 which controls the passage of the gases to either the vacuum pump 27 or the hydrogen outlet line 34 which connects with compressor 25. When cell 21 is producing oxygen valve 41 would open to the vacuum pump 27 and valve 42 to the hydrogen line. If cell 22 is producing oxygen the reverse is done. Valves 23 and 24 are moved to their proper positions to connect each of the outlet pipes to the vacuum line and the pump is operated until the residual gases are removed. (Other methods than the vacuum method could be used.) After the residual gases have been removed, the vacuum pump 27 is stopped and the control valves 23 and 24 must be positioned at the proper position for connecting the cells to the outlet line other than that to which it was connected during the last half cycle. This readies the system for generation of oxygen and hydrogen by the opposite cells and the current is reversed to carry out the evolution of oxygen from the cell that formerly produced hydrogen, and hydrogen from the cell which formerly produced oxygen. These cycles are continued for continuous oxygen generation by first one cell and then the other by first clearing the cells of residual gases at the end of each cycle, changing the position of the valves and then reversing the current through the cells.

Operation of the control valves, reversing switch 28, and control of the vacuum and hydrogen pumps may be carried out by hand; however, automatically shifting each cell of the generator from oxygen production to hydrogen production may be carried out by suitable mechanical equipment not shown for simplification of the drawings.

Suitable oxygen and hydrogen detectors 31 and 32 are placed respectively in the hydrogen and oxygen outlet lines to detect the presence of the respective gases desired to be detected, and prevented from passage into the wrong space, such as at the end of any half cycle. These detectors can be used for automatic control of the various parts for automatic operation of the system.

Suitable water lines 43 from a suitable source are connected between the outlet control valves 23 and 24 and the cells 21 and 22, for the purpose of replenishing the water as it is used up. The water may be added at the end of any half cycle through control valves 44.

In operation of the system for instance in a submarine for continuous generation of oxygen, one cell or bank of cells will be producing oxygen while "charging" whereas the other cell or bank of cells produces hydrogen while "discharging." For instance, for the system illustrated in Fig. 2, cell 21 has been "discharged" previously and is now in condition to evolve oxygen during charging, whereas cell 22 has been "charged" previously and is now ready to evolve hydrogen during discharge. Direct current from a suitable source is connected with the cells such that the current flows in opposite directions through each cell and cell 21 produces oxygen while cell 22 produces hydrogen. Valve 23 connects cell 21 to the oxygen outlet 33, while valve 24 is positioned to connect cell 22 with the hydrogen outlet 34. During operation with the valves in these positions, oxygen is produced by cell 21 and carried directly into the submarine whereas hydrogen is produced by cell 22 and pumped overboard by compressor 25. As operation continues, cell 21 approaches polarization at which point it begins to give off a little hydrogen, this will be detected by hydrogen detector 32 in the oxygen outlet line to indicate that a shift in the cycle is required. The current is turned off simultaneously in both cells by reversing switch 28 and then valves 23 and 24 are positioned to connect the outlets respectively to lines 29 and 30. Valve 41 is positioned to connect with the vacuum pump 27 and valve 42 is positioned to connect with hydrogen outlet line 34, then the vacuum pump 27 and the compressor 25 are started to clear the residual gases from the respective outlet lines and the head spaces of each cell. After the residual gases have been cleared, the vacuum pump 25 and the compressor 27 are turned off and the position of valves 23 and 24 are now positioned such that valve 23 connects the outlet of cell 21 with the hydrogen outlet line and valve 24 connects the outlet of cell 22 to the oxygen outlet line. The current to the cells is now turned on but in the opposite direction through the cells and oxygen is now generated by cell 22 and hydrogen is generated by cell 21. When cell 22 approaches polarization at which time a little hydrogen is given off the hydrogen sensing instrument 32 will again indicate the presence of hydrogen and the current through the cells is turned off and the process reversed again.

The oxygen sensing instrument 31 in the hydrogen line will sense the presence of the generation of oxygen by the cell that is evolving hydrogen which indicates that the negative plates have completely oxidized and the current should be turned off in both cells and the process reversed as described above.

Obviously a bank of cells would be required to supply sufficient oxygen to the required space of a submarine and therefore the above system of two different cells is for illustrative purposes only. The size of the plates and the number of cells is completely flexible and can be made according to the need. For example, for a complement of 100 men, each requiring a cubic foot of oxygen per hour, two banks of the type of cells described above, each bank of 125 cells with the cells of each bank operating in series and alternately generating oxygen and hydrogen, would provide the desired continuous supply of oxygen from a 100–ampere, 275–volt power source. Such a unit would occupy about 34.5 cubic feet and weigh about 4100 pounds.

Obviously many modifications and variations of the present invention are possible in the light of the above teachings. It is therefore to be understood that within the scope of the appended claims the invention may be practiced otherwise than as specifically described.

What is claimed is:

1. A system for constantly producing oxygen which comprises at least two separate electrolytic cells adapted to be connected to a direct current power source with the current flow in opposite directions through said cells, a gas outlet line connected to each of said cells, said current flow through said cells generating oxygen when the current flow is in one direction and hydrogen when the current flow is in the opposite direction whereby in operation oxygen is generated in one of said cells while hydrogen is generated in the other of said cells, a three position valve connected to each of said outlet lines, each of said valves having connected thereto first, second, and third outlet lines, one for each of said three positions, each of said first outlet lines being connected in common to an oxygen exit line, each of said second outlet lines being connected in common to a hydrogen exit outlet line, and each of said third outlet lines having a valve therein with two lines attached thereto, one of said lines being connected to a vacuum pump, the other of the last mentioned lines being connected to said hydrogen exit line, a hydrogen compressor pump connected to said hydrogen exit line, and a hydrogen detecting means positioned in said oxygen exit line and an oxygen detecting means positioned in said hydrogen exit line.

2. An oxygen/hydrogen gas generator which comprises a casing adapted to receive an aqueous solution which forms an electrolyte therein, alternate cadmium active plates and sheet nickel plates positioned within said casing and connected in parallel to separate outside terminals, said cadmium active plates being formed with a plurality of flat nickel plated steel pockets filled with cadmium active material, said nickel plates being formed with a plurality of perforations therein, said plates chemically reacting to produce only oxygen upon passing a current across said plates in one direction for a preset time and to produce only hydrogen upon passing a current across said plates in the opposite direction for a preset time.

3. An oxygen/hydrogen gas generator as claimed in claim 2 wherein the thickness of said cadmium plates are about 0.130 inch and the thickness of said sheet nickel plates are about 0.031 inch.

4. An oxygen/hydrogen gas generator as claimed in claim 3 where said alternate plates are separated by about 0.062 inch.

5. A system for supplying an essentially continuous supply of oxygen which comprises at least two oxygen generator cells having alternate positive and negative plates connected in parallel and connected to separate outside terminals adapted to be connected to a direct current source through a reversing switch, said current flow through said cells generating oxygen when the current flow is in one direction and hydrogen when the current flow is in the opposite direction, each of said cells being connected by a suitable gas line to separate control valves, said control valves being connected to at least two common outlet lines, one of said common outlet lines terminating within a chamber and the other of said common outlet lines terminating on the outside of said chamber, the direction of said current through each of said generator cells being in opposite directions across said plates whereby oxygen is generated in one cell and hydrogen is simultaneously generated in said other cell, and whereby the oxygen is released through one of said outlet lines to said chamber and the hydrogen is released through the other of said outlet lines to the outside of said chamber.

References Cited in the file of this patent

UNITED STATES PATENTS

| | | |
|---|---|---|
| 1,032,623 | Reed | July 16, 1912 |
| 1,218,584 | Sanders | Mar. 6, 1917 |
| 2,373,032 | Klein | Apr. 3, 1945 |
| 2,384,463 | Gunn et al. | Sept. 11, 1945 |
| 2,390,591 | Janes | Dec. 11, 1945 |
| 2,433,871 | Sutherland et al. | Jan. 6, 1948 |
| 2,571,927 | Neumann et al. | Oct. 16, 1951 |
| 2,686,153 | Hoeves | Aug. 10, 1954 |
| 2,708,211 | Koren et al. | May 10, 1955 |
| 2,798,110 | Peters | July 2, 1957 |